United States Patent [19]

Kanai

[11] Patent Number: 5,256,263
[45] Date of Patent: Oct. 26, 1993

[54] METHOD OF PURIFYING LACUSTRINE WATER AND FILTHY WATER PURIFICATION

[76] Inventor: Masakuni Kanai, 108, Hayama Ekohaitsu, 1750, Isshiki, Hayama-machi, Miura-gun, Kanagawa, 240-01, Japan

[21] Appl. No.: 777,293
[22] PCT Filed: Apr. 9, 1991
[86] PCT No.: PCT/JP91/00469
  § 371 Date: Dec. 6, 1991
  § 102(e) Date: Dec. 6, 1991
[87] PCT Pub. No.: WO91/15431
  PCT Pub. Date: Oct. 17, 1991

[30] Foreign Application Priority Data
Apr. 9, 1990 [JP] Japan ............................. 2-92335

[51] Int. Cl.$^5$ ............................................. C02F 1/46
[52] U.S. Cl. ................................. 204/149; 204/242; 204/269; 204/275; 210/128
[58] Field of Search ............... 204/149, 242, 269, 275; 210/128

[56] References Cited

U.S. PATENT DOCUMENTS

| | | | |
|---|---|---|---|
| 3,222,269 | 12/1965 | Stanton | 204/242 |
| 3,957,008 | 5/1976 | McCormick et al. | 114/67 A |
| 4,149,953 | 4/1979 | Rojo | 204/269 |
| 4,337,136 | 6/1982 | Dahlgren | 204/242 |
| 4,747,958 | 5/1988 | Eberhardt | 210/749 |
| 4,770,755 | 9/1988 | Valanti et al. | 204/225 |

FOREIGN PATENT DOCUMENTS

| | | |
|---|---|---|
| 2123321 | 1/1972 | France . |
| 57-53287 | 3/1982 | Japan . |
| 958329 | 9/1982 | U.S.S.R. . |

Primary Examiner—John Niebling
Assistant Examiner—Arun S. Phasge
Attorney, Agent, or Firm—Price, Gess & Ubell

[57] ABSTRACT

A method enabling thorough purification of lacustrine water with simple operation in an energy-saving manner within a short period of time and being free from the possibility of secondary public nuisance, and further a filthy water purification boat for implementing said method. According to this invention, while operating filthy water purification boat having an electrolyzing device for calcium fluoride, DC current power source, and coagulant pouring device mounted thereon on lakes or marshes, the electrolyzing device is operated and coagulant is fed into a pipe having a coagulant pouring nozzle. Lacustrine water, while passed through electrodes, is fed with fluorine ion and coagulant, and polluting substances coagulate and turn into flocks of a large diameter. These diametrally large flocks are recovered into the boat by a flock recovering device or adapted to sink to the bottom of lakes or marshes after volume reduction caused by hydrophobic action of the flocks, and purified water is returned to lakes or marshes.

14 Claims, 3 Drawing Sheets

METHOD OF PURIFYING LACUSTRINE WATER AND FILTHY WATER PURIFICATION

TECHNICAL FIELD

This invention relates to a method of purifying lacustrine water and a filthy water purification boat.

BACKGROUND ART

In a lake (the word "lake" used herein means a pond, a marsh and the like in addition to a lake), water is hard to move as compared with in the sea or rivers, resulting in stagnating and fails to exhibit a satisfactory self-purifying action, so that pollution of lacustrine water gets worse, to thereby often cause production of algae, odor development and the like.

Purification of lacustrine water thus polluted has been conventionally carried out by arranging an aeration system at a lake, installing a water treating system on the land, or drawing up water by means of a pump from a lake for treatment.

DISCLOSURE OF INVENTION

However, use of the aeration system for evenly purifying lacustrine water requires lots of time. Purification of lacustrine water through the water treating system requires arrangement of a water suction and guide pipe network over a whole lake. Unfortunately, this obstructs navigation of boats, so that it is difficult to evenly purify lacustrine water. The present invention solves the above-described problem by operating, on a lake, a filthy water purification boat mounted with a calcium fluoride electrolyzing device.

In accordance with one aspect of the present invention, a method of purifying lacustrine water is provided. The method comprising the steps of operating a boat provided with a calcium fluoride electrolyzing device, a DC power supply device electrically connected to the electrolyzing device and a coagulant pouring device on a lake, and concurrently introducing lacustrine water into the electrolyzing device and pouring coagulant into lacustrine water through the coagulant pouring deivce.

In a preferred embodiment of the method of the present invention, the boat is further provided with a flock recovering device for recovering a part or all of the flocks produced.

In a preferred embodiment of the method of the present invention, lacustrine water introduced into the electrolyzing device is treated while being stirred.

In accordance with another aspect of the present invention, a filthy water purification boat is provided. The boat comprises an electrolyzing device suspendedly arranged at a lower portion of the boat and including a plurality of electrode plates juxtaposed to each other at suitable intervals on struts and a cage arranged between each adjacent two of the electrode plates for receiving fluorite therein; a coagulant pouring device including a pipe provided with coagulant pouring nozzles and arranged forward of the electrode plates and a coagulant tank arranged on the boat; and a DC power supply arranged on the boat and electrically connected to the electrolyzing device.

In a preferred embodiment of the filthy water purification boat of the present invention, a flock recovering device of which at least a part is arranged at a rear portion of the boat is further provided.

In the present invention constructed as described above, the filthy water purification boat on which the calcium fluoride electrolyzing device, DC power supply and coagulant pouring device are mounted and the flock recovering device may be further mounted as desired is operated on a lake. With operation of the filthy water purification boat, the electrolyzing device is actuated and coagulant is fed to the pipe provided with the coagulant pouring nozzles; so that lacustrine water is caused to flow between the electrodes, during which lacustrine water is fed with fluorine ions ($F^-$) and coagulant. The fluorine ions cause polluting substances contained in lacustrine water to form flocks and the coagulant causes the flocks to be increased in particle size, so that lacustrine water may be purified. The flocks thus large-sized are recovered through the flock recovering device to the boat or settle on a bottom of a lake due to a decrease in volume of the flocks by a hydrophobic action of the flocks. The purified water is returned to a lake during operation of the boat. Therefore, when the filthy water purification boat is operated on a whole lake, lacustrine water may be evenly purified; whereas the operation of the boat with respect to a limited area of a lake facilitates concentrated or local purification of lacustrine water.

Thus, in the present invention, operation of the filthy water purification boat at a local area of a lake permits lacustrine water to be partially selectively treated. Alternatively, operation of the boat over a whole lake permits lacustrine water to be wholly treated. Also, the present invention permits introduction of lacustrine water into the boat and discharge of purified water to a lake to be concurrently and continuously carried out without any other specific operation.

Further, the present invention allows lacustrine water to be evenly purified with simple operation, in an energy-saving manner and in a significantly reduced period of time and effectively prevents secondary public nuisance.

BEST MODES FOR CARRYING OUT INVENTION

Figure 2:
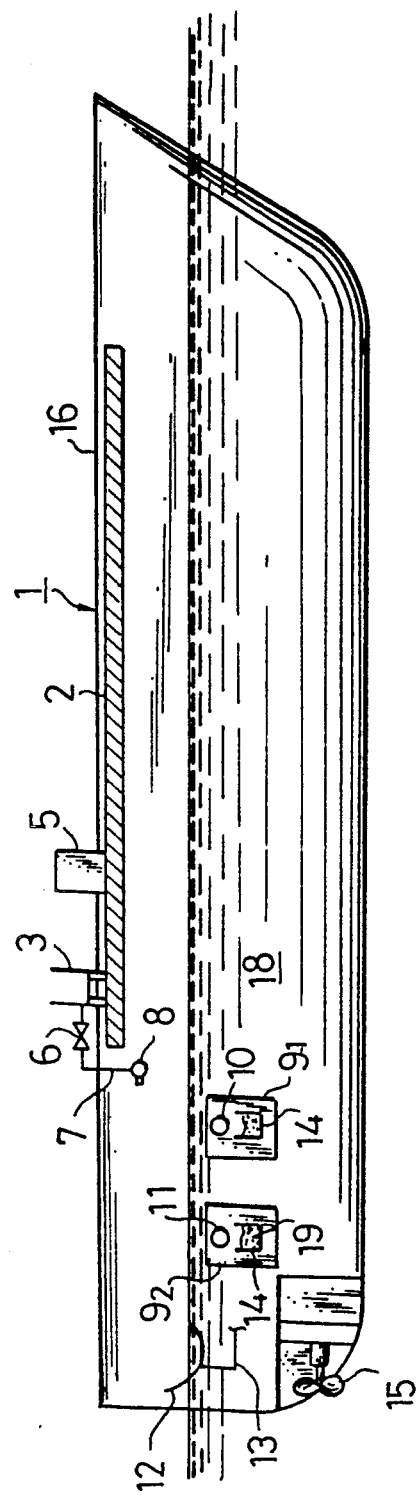
FIG. 2 is a sectional view taken along line II—II of FIG. 1.
Figure 3:
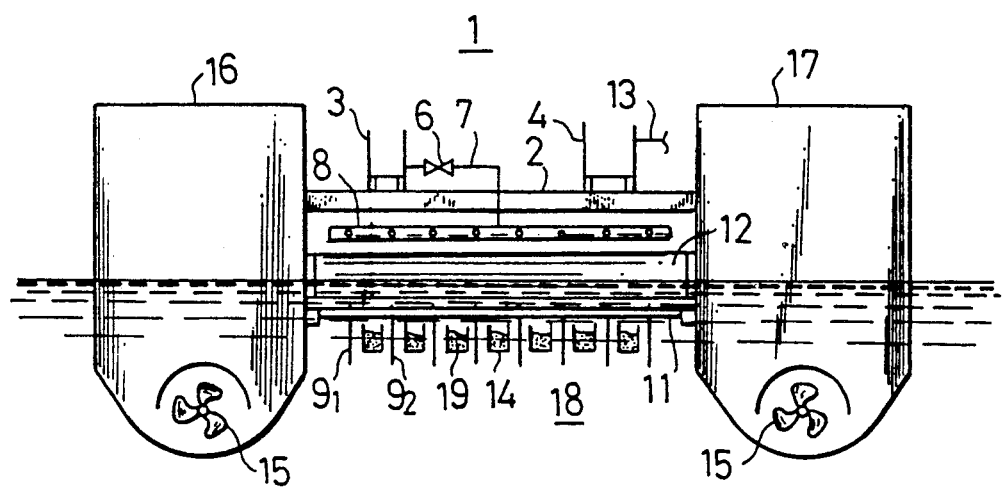
FIG. 3 is a left side elevation view of the filthy water purification boat shown in FIG. 1.

A filthy water purification boat according to the present invention will be described hereinafter with reference to FIGS. 1 to 3. A filthy water purification boat in the form of a double hull boat or catamaran which is generally designated by reference numeral 1 includes a pair of hulls 16 and 17 arranged opposite to each other and a deck 2 arranged so as to extend between the hulls 16 and 17. On the deck 2 are mounted a coagulant storage tank 3 for storing an aqueous coagulant solution such as, for example, an iron coagulant solution in water, a flock storage tank 4 for storing recovered flocks, and a DC power supply 5. To the coagulant storage tank 3 is connected a pipe 8 provided with coagulant pouring nozzles through a pipe line 7 provided with a valve 6. The coagulant pouring nozzles each are adapted to pour the aqueous solution by dropping. Thus, a coagulant pouring system is provided.

Also, the boat includes a front strut 10 and a rear strut 11 arranged at a lower portion of the boat and rearward of the pipe 8 having the coagulant pouring nozzles so as to extend between the hulls 16 and 17 and be spaced from each other at a suitable interval in a longitudinal direction of the boat. The struts 10 and 11 are respectively mounted thereon with a plurality of cathode plates $9_1$ and anode plates $9_2$ electrically connected to the DC power supply 5 in a manner to be alternately arranged at suitable intervals. Rearward of the rear strut 11 is arranged a trough 12 for recovering flocks so as to extend between the hulls 16 and 17. The trough 12 is connected at a bottom thereof through a pipe line 13 and a flock suction pump (not shown) to the flock storage tank 4. Thus, a flock recovery system is provided.

Figure 1:
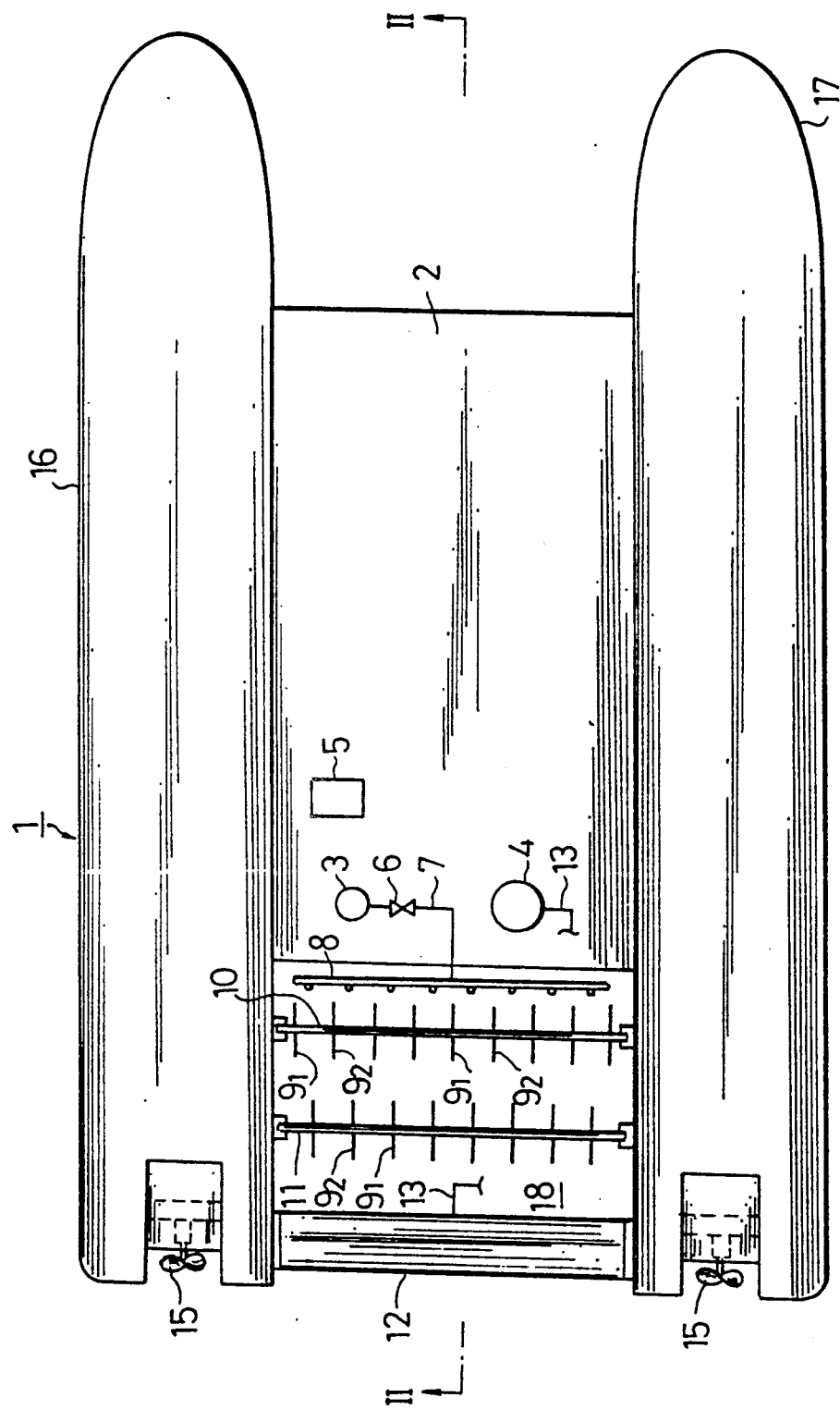
FIG. 1 is a plan view showing an embodiment of a filthy water purification boat according to the present invention.

Between opposite surfaces of each adjacent two electrode plates $9_1$ and $9_2$ is suspendedly arranged a cage 14 for receiving fluorite 9 mainly consisting of calcium fluoride and formed into a powder-like, particulate or lump-like shape (the cage 14 and fluorite 19 being omitted in FIG. 1). The electrode plates $9_1$ and $9_2$, and cage 14 are dipped in lacustrine water in a flow passage 18 defined between the hulls 16 and 17. The electrode plates $9_1$ and $9_2$, fluorite 19 and cage 14 thus arranged cooperate with each other to provide an electrolyzing system. As desired, a means for promoting stirring of water between the electrode plates $9_1$ and $9_2$ such as baffles or the like may be arranged at suitable places. In the drawings, reference numeral 15 designate a screw propeller.

Now, the manner of operation of the filthy water purification boat and the manner of purification of lacustrine water by the boat will be described hereinafter. When the filthy water purification boat is forward driven at a low velocity on a lake, lacustrine water is caused to flow into the tunnel-like flow passage 18 defined by cooperation of the deck 2 with the opposite hulls 16 and 17, then pass through gaps between the electrode plates $9_1$ and $9_2$ and finally rearward flow out from the boat.

With forward movement of the boat, the DC power supply 5 is actuated to apply a DC voltage of 3 V or more between the electrode plates $9_1$ and $9_2$ and the valve 6 is opened to feed the aqueous coagulant solution through the pouring nozzles of the pipe 8 to the lacustrine water passing through the flow passage by dropping. This causes fluorine ions ($F^-$) to be produced from the fluorite 19 to fluorinate polluting substances in the lacustrine water, resulting in fluorides of a high polarity being produced. The fluorides coagulate together due to positive and negative charges thereof to form particulate flocks, so that the lacustrine water is purified. To the flocks thus formed adhere fine bubbles of hydrogen gas to cause the flocks to try to rise to the surface of the water, during which iron ions ($Fe^{3+}$) produced from the iron coagulant lead to further coagulation of the flocks to cause the flocks to have an increased particle size. Then, the flocks flow into the trough 12 and are recovered to the flock storage tank 4, during which most of the purified water rearward flows out through the flow passage 18 between the hulls 16 and 17.

The flocks produced by the action of the fluorine ions is allowed to be hydrophobic in about 30 minutes after production of the flocks, so that a part or most of the flocks is reduced in volume by 1/5 to 1/10, resulting in settling on a bottom of a lake and then being cementified in the form of a mixture of clay, calcium silicate, lime and the like, so that they do not form organic sludge. Thus, it is not necessarily required to recover all of the flocks. Also, a calcium ion ($Ca^{2+}$) produced during the electrolytic treatment combines with a fluorine ion remaining unreacted to form calcium fluoride hard to dissolve, which then settles. Algae such as water-bloom and the like and spores thereof are likewise treated.

Another embodiment of the invention may be constructed in such a manner that the above-described electrolytic system and the like are arranged on a barge, which may be towed by a tug-boat.

Further, the screw propeller may be vertically moved, so that any sludge accumulating on a bottom of a lake may be subject to an electrolytic treatment while being agitated, resulting in the sludge being treated into a material which does not cause any public nuisance.

I claim:

1. A filthy water purification boat comprising:
   an electrolyzing device suspendedly arranged at a lower portion of the boat and including a plurality of electrode plates ($9_1$, $9_2$) juxtaposed to each other at suitable intervals on struts (10, 11) and a cage (14) arranged between each adjacent two of said electrode plates for receiving fluorite (19) therein;
   a coagulant pouring device including a pipe (8) provided with coagulant pouring nozzles and arranged forward of said electrode plates ($9_1$, $9_2$) and a coagulant tank (3) arranged on the boat; and
   a DC power supply (5) arranged on the boat and electrically connected to said electrolyzing device.

2. A filthy water purification boat as defined in claim 1, further comprising a flock recovering device (4, 12, 13) of which at least a part is arranged at a rear portion of the boat.

3. A filthy water purification boat as defined in claim 1, further comprising a pair of hulls (16, 17) arranged opposite to each other to define a flow passage (18) therebetween;
   said electrolyzing device ($9_1$, $9_2$, 14, 19) being arranged in said flow passage (18).

4. A filthy water purification boat as defined in claim 3, said struts (10, 11) are arranged between said hulls (16, 17); and
   said flock recovering device (4, 12, 13) includes a trough (12) arranged between said hulls (16, 17).

5. A filthy water purification boat as defined in claim 2, further comprising a pair of hulls (16, 17) arranged opposite to each other to define a flow passage (18) therebetween;
   said electrolyzing device ($9_1$, $9_2$, 14, 19) being arranged in said flow passage (18).

6. A method of purifying a large body of lacustrine water with a boat that can be propelled across the water, the boat having means for dispensing a coagulant agent, an electrolyzing apparatus suspended from the boat in the water, and a chemical agent to be suspended in the water adjacent the electrolyzing apparatus so that it can be electrolyzed to produce ions to react with organic substances, comprising the steps of:
   propelling the boat through the water;
   suspending a quantity of chemical agent in a fixed position in the water relative to the propelled boat;
   activating the electrolyzing apparatus to electrolyze the chemical agent to produce ions for reaction with organic substances in the water; and
   concurrently dispensing a coagulant upstream of a site of reaction of the ions with the organic substances to be propelled by the water relative to the boat for coagulating any resulting flocks formed by the reaction.

7. The method of claim 6 wherein the chemical agent is calcium fluoride.

8. The method of claim 6, further including collecting, downstream of the dispensed coagulant, the flocks formed by the reaction.

9. The method of claim 6 wherein the coagulant is an iron salt.

10. The method of claim 6, further including means for stirring the lacustrine water adjacent the electrolyzing apparatus.

11. Apparatus for purifying a large body of lucustrine water, comprising:
- a flotation hull for floating on the water;
- means for propelling the flotation hull across the water;
- a series of electrode plates fixedly arranged beneath the hull for suspension in the water;
- means for providing a charge potential difference to the electrode plates;
- means for suspending a chemical agent adjacent the electrode plates at a fixed position beneath the hull to enable the charged electrode plates to electrolyze the chemical agent to produce ions for reaction with the lacustrine water; and
- means for dispensing a coagulant agent that will cause the reactant products to flocculate at a position upstream of the suspended chemical agent, whereby movement of the flotation hull will cause the lacustrine water to pass through the series of electrode plates and mix with the chemical agent and, subsequently, the coagulant agent, to purify the lacustrine water.

12. The apparatus of claim 11, further including means for collecting the resultant flocks and storing them on the flotation hull.

13. The apparatus of claim 11, further including means for stirring the lacustrine water adjacent the electrode plates.

14. Apparatus for purifying a large body of lacustrine water, comprising:
- a pair of spaced elongated hulls for floating on a surface of the water;
- a plurality of anode plates;
- a plurality of cathode plates;
- means for intermittently supporting the anode plates and the cathode plates between the hulls and under the surface of the water;
- a plurality of porous retention containers positioned between respective anode and cathode plates and under the surface of the water;
- an ion-producing chemical agent capable of reacting with lacustrine water positioned in each retention container;
- means for propelling the hulls to force lacustrine water to flow across the anode plates and cathode plates;
- means for providing an electrical potential between the anode plates and the cathode plates to electrolyze the chemical agent to produce ions for reaction with the lacustrine water;
- means for dispensing a coagulant agent that will cause the reactant products to flocculate and float to the surface of the water; and
- trough means extending between the hulls to collect the floating flocks.

* * * * *